Patented Nov. 9, 1948

2,453,673

UNITED STATES PATENT OFFICE 2,453,673

ALKAMINE ESTERS OF PYRROLE-3,4-DICARBOXYLIC ACIDS

Donald E. Sargent, Easton, Pa., assignor to American Cyanamid Company, New York, N. Y., a corporation of Maine No Drawing. Application November 14, 1946, Serial No. 709,779

4 Claims. (Cl. 260—313)

This invention relates to alkamine esters of pyrrole 3,5-dicarboxylic acids.

Various alkyl esters of pyrrole carboxylic acids have been prepared by ordinary means, but the alkamine esters cannot be made by the usual methods, and it is with these esters that the present invention is concerned. They may be represented by the following structural formula:

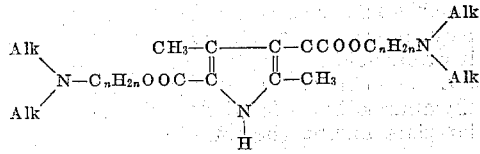

in which alk is alkyl and $n$ is a positive integer greater than 0. The esters of the present invention are useful for a number of purposes, some being activators for rubber accelerators and some exhibiting local anaesthetic power.

The esters of the present invention may be prepared by catalyzed alcoholysis of the corresponding alkyl esters using an alkali metal alcoholate as the catalyst. The alkyl esters are in general best prepared by reacting esters of ketoacetic acids with sodium nitrite in acetic acid, followed by reduction of the α-nitroso compound with zinc and condensation of the resulting α-aminoketoacetic acid ester with additional ketoacetic acid ester to give the pyrrole diester. The most readily prepared ester is the diethyl ester of 2,4-dimethylpyrrole-3,5-dicarboxylic acid which may be produced by reacting acetoacetic ester with sodium nitrite in glacial acetic acid, reducing the nitroso compound with zinc dust, and condensing the so-formed α-aminoacetoacetic ester with additional acetoacetic ester by warming in the presence of acetic acid.

The alkamine esters of the present invention are obtainable in the form of the free bases or in the form of their salts, such as hydrochlorides. When used as local anaesthetics the latter form is preferred as it is in general more water soluble. The free bases, however, show greater effectiveness as activators for rubber accelerators.

The invention will be illustrated in greater detail in conjunction with the following specific examples which are typical illustrations. The parts are by weight and temperatures are uncorrected unless otherwise specified.

EXAMPLE 1

β-diethylaminoethyl - 2,4 - dimethylpyrrole - 3,5-dicarboxylate

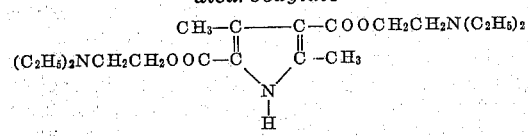

239 parts of ethyl-2,4-dimethylpyrrole-3,5-dicarboxylate and 590 parts of β-diethylaminoethanol to which 3 parts of metallic sodium have been added are heated together in a vessel provided with an air cooled fractionating column. The pyrrole ester dissolves in a few moments and the alcoholysis proceeds with the appearance of green-brown fluorescence. The temperature is gradually raised and the ethyl alcohol for the most part distilled off at 78–80° C. Thereupon the pressure is reduced to 20 mm. and the excess β-diethylaminoethanol removed.

The residue is a viscous dark brown oil which is dissolved in ether, washed with dilute sodium chloride solution and then with water. The ether solution is then treated with dilute hydrochloric acid which converts ester into the water soluble dihydrochloride. The aqueous layer is removed, made basic with sodium carbonate and the free base extracted with ether.

The ether extract is dried, the ether removed under reduced pressure and the remaining viscous dark brown oil fractionally distilled under a pressure of 6 mm. A viscous orange-yellow fraction comes over at 196–212° C. (corr.). This fraction does not crystallize even on standing and is soluble in ethyl alcohol, acetone and benzene, moderately soluble in ether, and insoluble in water. It has a refractive index of about 1.5.

The dihydrochloride is not readily obtainable in a crystalline form, but can be obtained in water solution.

When the process is carried out using an equivalent amount of methyl 2,4-dimethylpyrrole-3,5-carboxylate instead of the ethyl ester the same compound is obtained and the reaction proceeds in the same manner, except that the distillation temperature at the start is that corresponding to the removal of methyl alcohol.

EXAMPLE 2

The procedure of Example 1 is followed but the β-diethylaminoethanol is replaced by stoichiometrically equivalent amount of β-dimethylaminoethanol. The product obtained has properties substantially the same as those of Example 1.

EXAMPLE 3

γ-diethylaminopropyl - 2,4 - dimethylpyrrole-3,5-dicarboxylate

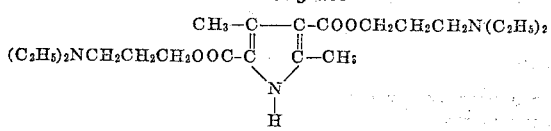

240 parts of ethyl-2,4-dimethylpyrrole-3,5-dicarboxylate are mixed with 786 parts of γ-diethylaminopropanol to which a small amount of metallic sodium has been added. The mixture is then heated in a vessel provided with a fractionating column. As the reaction proceeds ethyl alcohol distills over at 78–80° C. and when the temperature begins to rise materially higher the pressure is reduced and γ-diethylaminopropanol distilled off.

The residue is a dark brown oil which is dissolved in 2500 parts of ether and washed twice with 1000 parts of water. The ether solution is then dried and the ether removed by evaporation under diminished pressure. The residual oil is then fractionally distilled under a pressure of 5 mm., an orange-red oil coming over at 195–205° C. (corr.). The ester is easily soluble in acetone, ethyl alcohol and benzene, moderately soluble in ether and insoluble in water. It has a refractive index of slightly over 1.51.

EXAMPLE 4

The procedure of Example 3 is followed but the γ-diethylaminopropanol is replaced by a stoichiometrically equivalent amount of γ-dipropylaminopropanol. The product obtained has substantially the same properties as that of Example 3.

In the foregoing examples the catalyst sodium is added to the γ-diethylaminoalkanol, where it, of course, reacts to produce the alcoholate. The addition of the sodium is in no sense critical. It may be added to the reaction mixture, or it may be reacted either with the amino alcohol or with ordinary ethyl alcohol to form an alcoholate and the ready formed alcoholate added to the reaction mixture. The relative insensitiveness of the reaction to the method of addition of the sodium alcoholate and the smoothness of the reaction is in marked contrast to the ordinary characteristics of amino alcohols and their esters, which usually are sensitive to oxidation in alkaline solution. No reason is advanced here why the present reaction proceeds readily in spite of this normal tendency to side reactions.

The amount of alkali metal alcoholate present is not critical, but it should be in catalytic amounts, that is to say, amounts which are sufficient to vigorously catalyze the reaction but far below stoichiometric proportions. Good results are obtained with amounts of alcoholate of the order of $\frac{1}{10}$ mole per mole of the dicarbalkoxypyrrole. This proportion is not critical and the term "catalytic amounts" will be used in the claims in its ordinary sense of small amounts far below stoichiometric proportions. Sodium can be replaced by potassium, but this presents no advantage in the reaction and, therefore, does not economically warrant the higher cost of potassium. For this economic reason the sodium alcoholate is preferred as the catalyst.

In many of the examples the dihydrochlorides of the products are described. These salts are most readily prepared and where the product is of utility as a local anaesthetic are preferred because they are readily soluble in water. The esters, however, are capable of reacting with other strong acids to produce the corresponding salts.

This application is in part a continuation of my copending application Serial No. 496,962, filed July 31, 1943, now abandoned.

I claim:

1. A member of the group consisting of esters of 2,4 - dimethylpyrrole-3,5 - dicarboxylic acids having the formula:

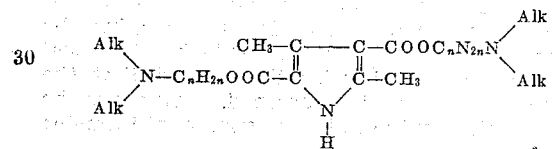

in which $n$ is a positive integer greater than zero and Alk is alkyl, and addition salts of the esters with strong acids.

2. A member of the group consisting of β-diethylaminoethyl - 2,4-dimethylpyrrole - 3,5-dicarboxylate having the formula:

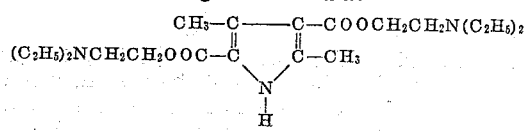

and addition salts of the ester with strong acids.

3. A member of the group consisting of γ-diethylaminopropyl - 2,4-dimethylpyrrole - 3,5-dicarboxylate having the formula:

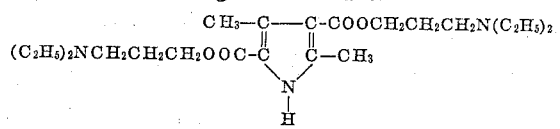

and addition salts of the ester with strong acids.

4. A method of producing an alkamine ester of 2,4-dimethylpyrrole-3,5-dicarboxylic acid which comprises heating the dialkyl ester of the same acid with the desired dialkylamino alkanol in the presence of catalytic amounts of an alkali metal alcoholate.

DONALD E. SARGENT.

No references cited.